United States Patent
Li et al.

(10) Patent No.: US 10,719,751 B2
(45) Date of Patent: Jul. 21, 2020

(54) ANTI-REMOVAL MONITORING CIRCUITRY, ELECTRONIC TAG, ANTI-THEFT SYSTEM AND ANTI-THEFT METHOD

(71) Applicant: BOE TECHNOLOGY GROUP CO., LTD., Beijing (CN)

(72) Inventors: Tao Li, Beijing (CN); Changlin Leng, Beijing (CN); Xiao Zhang, Beijing (CN); Xinxin Mu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/247,619

(22) Filed: Jan. 15, 2019

(65) Prior Publication Data

US 2019/0370622 A1  Dec. 5, 2019

(30) Foreign Application Priority Data

May 29, 2018  (CN) .......................... 2018 1 0531358

(51) Int. Cl.
| | | |
|---|---|---|
| *G06K 19/073* | (2006.01) | |
| *G06K 19/07* | (2006.01) | |
| *G06K 19/077* | (2006.01) | |
| *G08B 13/24* | (2006.01) | |

(52) U.S. Cl.
CPC ....... *G06K 19/073* (2013.01); *G06K 19/0707* (2013.01); *G06K 19/0725* (2013.01); *G06K 19/0772* (2013.01); *G08B 13/2402* (2013.01)

(58) Field of Classification Search
CPC .............. G08B 13/2402; G08B 13/243; G08B 13/2462
See application file for complete search history.

(56) References Cited

U.S. PATENT DOCUMENTS

| | | | | |
|---|---|---|---|---|
| 3,444,547 A | * | 5/1969 | Surek ................. | G08B 13/1454 340/650 |
| 5,023,596 A | * | 6/1991 | Sirman .................... | B62H 5/20 340/571 |
| 5,856,782 A | * | 1/1999 | Sasagawa .......... | G08B 13/1463 340/571 |
| 5,959,532 A | * | 9/1999 | Fujiuchi ............. | G08B 13/1463 340/572.1 |

(Continued)

FOREIGN PATENT DOCUMENTS

| | | |
|---|---|---|
| CN | 201111115 Y | 9/2008 |
| CN | 201203881 Y | 3/2009 |

(Continued)

*Primary Examiner* — Hongmin Fan
(74) *Attorney, Agent, or Firm* — Brooks Kushman P.C.

(57) ABSTRACT

The present disclosure provides an anti-removal monitoring circuitry, applied to an electronic tag. The circuitry includes a first input terminal, a second input terminal and an output terminal. The circuitry further includes: a shutdown circuit, configured to control the electronic tag to be in a shutdown state in response to connection between the first input terminal and the second input terminal; and a starting-up circuit, configured to control the output terminal to output a pulse voltage signal in response to disconnection between the first input terminal and the second input terminal, in such a manner that the electronic tag generates an alarm signal in response to the pulse voltage signal.

20 Claims, 11 Drawing Sheets

(56) References Cited

U.S. PATENT DOCUMENTS

| | | | | |
|---|---|---|---|---|
| 6,150,923 A | * | 11/2000 | Johnson | G08B 3/10 340/384.1 |
| 6,243,005 B1 | * | 6/2001 | Haimovich | G09F 3/0329 340/427 |
| 6,420,971 B1 | * | 7/2002 | Leck | E05B 39/04 340/542 |
| 7,227,467 B2 | * | 6/2007 | Feibelman | E05B 73/0041 340/568.1 |
| 7,272,962 B2 | * | 9/2007 | Benda | E05B 67/006 70/18 |
| 7,474,209 B2 | * | 1/2009 | Marsilio | E05B 45/005 340/568.1 |
| 2006/0145848 A1 | * | 7/2006 | Marsilio | G08B 13/1445 340/568.2 |
| 2006/0220848 A1 | * | 10/2006 | Tropper | G08B 13/2434 340/568.1 |
| 2007/0080806 A1 | * | 4/2007 | Lax | G08B 13/19658 340/572.1 |
| 2013/0147625 A1 | * | 6/2013 | Sayegh | G08B 13/2451 340/568.2 |

FOREIGN PATENT DOCUMENTS

| | | | | |
|---|---|---|---|---|
| CN | 201369060 Y | | 12/2009 | |
| CN | 203217607 U | | 9/2013 | |
| CN | 204990367 U | | 1/2016 | |
| CN | 204990368 U | | 1/2016 | |
| JP | 411296759 A | * | 9/1999 | G08B 13/24 |

* cited by examiner

ANTI-REMOVAL MONITORING CIRCUITRY, ELECTRONIC TAG, ANTI-THEFT SYSTEM AND ANTI-THEFT METHOD

CROSS-REFERENCE TO RELATED APPLICATION

This application claims priority to Chinese Patent Application No. 201810531358.5 filed on May 29, 2018, which is incorporated herein by reference in its entirety.

TECHNICAL FIELD

The present disclosure relates to the field of wireless communication, in particular to an anti-removal monitoring circuitry, an electronic tag, an anti-theft system and an anti-theft method.

BACKGROUND

As a communication technology, an RFID (Radio Frequency Identification) technology may identify a specific target through a wireless electrical signal as well as read and write related data, without establishing a mechanical or optical contact between an identification system and the specific target.

In recent years, it is widely appreciated that the RFID technology is applied to an automobile electronic identification system managed by an automobile. The RFID technology has the operating principle of automatically identifying the automobile by using wireless radio waves, with advantages of small influence from environments, high identification speed, high identification rate, or the like.

In the related art, an automobile electronic tag or an automobile electronic license plate is placed on a front windshield of the automobile, for displaying vehicle inspection information. The electronic tag or the electronic license plate is taken as a unique identifier of the automobile. However, the vehicle-mounted electronic tag, the electronic license plate or an ETC (Electronic Toll Collection) system in the related art has potential safety problems and still needs to be improved.

SUMMARY

In a first aspect, an anti-removal monitoring circuitry is provided according to embodiments of the present disclosure, applied to an electronic tag, and the circuitry includes a first input terminal, a second input terminal and an output terminal. The anti-removal monitoring circuitry further includes:

a shutdown circuit, configured to control the electronic tag to be in a shutdown state in response to connection between the first input terminal and the second input terminal; and a starting-up circuit, configured to control the output terminal to output a pulse voltage signal in response to disconnection between the first input terminal and the second input terminal, in such a manner that the electronic tag generates an alarm signal in response to the pulse voltage signal.

In some optional embodiments, the starting-up circuit includes:

a switch element, having a control terminal connected with the first input terminal, and a first terminal connected with the output terminal;

a charging unit, having a first terminal connected with a second terminal of the switch element, and a second terminal connected with a first voltage input terminal; and a first resistor, having a first terminal connected with a power input terminal, and a second terminal connected with the control terminal of the switch element, where the power input terminal is configured to receive a power voltage for supplying power to the anti-removal monitoring circuitry.

In some optional embodiments, the shutdown circuit includes: a first diode, a cathode of which is connected with the control terminal of the switch element, and an anode of which is connected with a detecting terminal.

In some optional embodiments, the charging unit includes:

a second resistor, a first terminal of which is connected with the second terminal of the switch element; and a first capacitor, a first terminal of which is connected with a second terminal of the second resistor, and a second terminal of which is connected with a first voltage input terminal.

In some optional embodiments, the charging unit further includes: a first voltage-regulator diode, a cathode of which is connected with the first terminal of the first capacitor, and an anode of which is connected with the second terminal of the first capacitor.

In some optional embodiments, the circuitry further includes: a manual switch, a first terminal of which is connected with the first terminal of the first capacitor, and a second terminal of which is connected with a second voltage input terminal, where the manual switch is configured to control the electronic tag to be in a shutdown state or in a starting up state in response to a manual trigger of an operator.

In some optional embodiments, the circuitry further includes: a second diode, a cathode of which is connected with the control terminal of the switch element, and an anode of which is connected with the second terminal of the switch element.

In some optional embodiments, the circuitry further includes: a second voltage-regulator diode, a cathode of which is connected with the first input terminal, and an anode of which is connected with a third voltage input terminal.

In some optional embodiments, the circuitry further includes: a second capacitor, a first terminal of which is connected with the first input terminal, and a second terminal of which is connected with a fourth voltage input terminal.

In some optional embodiments, the second input terminal, the first voltage input terminal, the second voltage input terminal, the third voltage input terminal and the fourth voltage input terminal each is grounded.

In a second aspect, an electronic tag is provided according to embodiments of the present disclosure, and includes:

a housing body, including two punched holes;

an anti-removal monitoring circuitry, arranged on the housing body, including a first input terminal, a second input terminal and an output terminal, where the anti-removal monitoring circuitry further includes:

a shutdown circuit configured to shut down the electronic tag in response to connection between the first input terminal and the second input terminal, and a starting-up circuit configured to control the output terminal to output a pulse voltage signal in response to disconnection between the first input terminal and the second input terminal; and a processing module, connected with the anti-removal monitoring circuitry, and configured to receive the pulse voltage signal and generate an alarm signal in response to the pulse voltage signal, where the first input terminal and the second input terminal of the anti-removal monitoring circuitry correspond to the two punched holes of the housing body respectively.

In some optional embodiments, the electronic tag further includes: a charging module, connected with the anti-removal monitoring circuitry, and configured to supply power to the electronic tag.

In some optional embodiments, the electronic tag further includes:

a memory module, connected with the processing module, and configured to store user information, where the processing module is configured to encrypt the user information stored in the memory module, upon receipt of the pulse voltage signal.

In some optional embodiments, the electronic tag further includes:

a fingerprint identification module, connected with the processing module, and configured to collect a fingerprint, compare the collected fingerprint with a user fingerprint stored in the memory module, and decrypt the user information when the collected fingerprint is the same as the user fingerprint stored in the memory module.

In some optional embodiments, the electronic tag further includes:

a positioning module, connected with the processing module, and configured to collect position information of the electronic tag in response to the processing module receiving the pulse voltage signal.

In some optional embodiments, the electronic tag further includes:

an RF (Radio Frequency) transceiver module, connected with the processing module, where when the pulse voltage signal is transmitted to the processing module, and the RF transceiver module receives a request from a reader for reading user information pre-stored in the electronic tag, the processing module is configured to prohibit the reader from reading the user information, and instruct the RF transceiver module to transmit the alarm signal to the reader.

In some optional embodiments, the charging module includes: a solar panel, a charging unit and a rechargeable battery, and the charging unit converts luminous energy collected by the solar panel into electric energy to charge the rechargeable battery.

In a third aspect, an anti-theft system for an electronic tag is provided according to embodiments of the present disclosure, and includes the above-mentioned electronic tag and a base. The base includes:

a chassis;

a pair of conductive posts, arranged on the chassis, penetrating through the two punched holes respectively, and electrically connected with the first input terminal and the second input terminal respectively; and a conductive element, arranged on a first surface of the chassis where the pair of conductive posts are located, located between the pair of conductive posts, and configured to electrically connect the pair of conductive posts.

In some optional embodiments, an adhesive layer is arranged on the first surface of the chassis where the pair of conductive posts is located, and is configured to adhere the electronic tag onto the chassis.

In a fourth aspect, an anti-theft method, applied for the above anti-theft system, is provided according to embodiments of the present disclosure. The method includes:

controlling the electronic tag in a shutdown state in response to installing the electronic tag onto the base, in the case that each of the pair of conductive posts penetrates through the two punched holes, and the first input terminal and the second input terminal are electrically connected; and generating the alarm signal by the anti-removal monitoring circuitry of the electronic tag in response to removing the electronic tag from the base.

BRIEF DESCRIPTION OF THE DRAWINGS

The embodiments of the present disclosure will be described below in detail in combination with drawings.

REFERENCE SIGNS IN THE DRAWINGS ARE AS FOLLOWINGS

Figure 1:
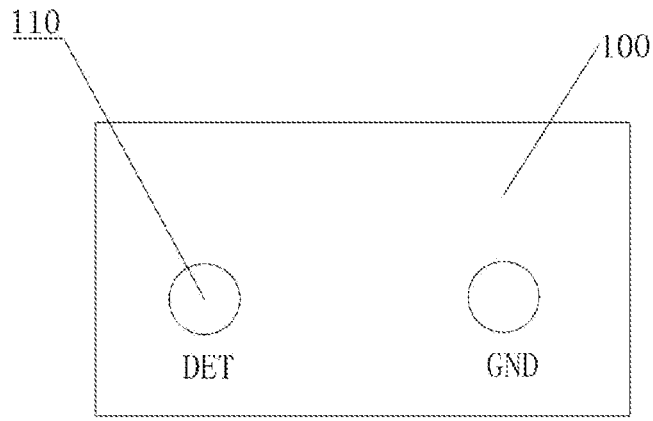
FIG. 1 shows a front view of an electronic tag according to at least one embodiment of the present disclosure.

100 housing body;
110 punched hole;
200 base;
210 conductive post;
220 conductive element;
230 chassis;
300 first adhesive layer;
400 second adhesive layer;
500 starting-up circuit;
501 RC charging unit; and
600 shutdown circuit.

DETAILED DESCRIPTION

In order to more clearly explain the present disclosure, the present disclosure will be further explained in combination with optional embodiments and drawings as follows. In the drawings, similar parts are denoted by similar reference numerals. A person skilled in the art should understand that the following description is merely illustrative and non-limiting, and does not limit the protection scope of the present disclosure.

In the related art, a vehicle-mounted electronic tag, an automobile electronic license plate or an ETC system is attached onto the windshield only by adhesive, so may be removed at random, resulting in a poor anti-theft capability. Moreover, they may be reused into other objects after removed, which may reveal personal information of a user, and cause property loss. In order to solve the above-mentioned technical problems, embodiments of the present disclosure provide an anti-removal monitoring circuitry, an electronic tag, an anti-theft system and an anti-theft method.

As shown in FIG. 1, at least one embodiment of the present disclosure provides an electronic tag, which mainly includes a housing body 100 provided with two punched holes 110.

Figure 2:
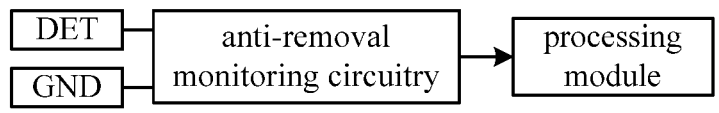
FIG. 2 shows a structural block diagram of an electronic tag according to at least one embodiment of the present disclosure.

As shown in FIG. 2, an anti-removal monitoring circuitry, a charging module and a processing module are arranged on the housing body 100.

When the electronic tag is removed, the anti-removal monitoring circuitry outputs a pulse voltage signal, such that the electronic tag generates an alarm signal in response to the pulse voltage signal. A structure of the anti-removal monitoring circuitry will be explained below in detail.

The processing module is mainly configured to receive a pulse voltage signal outputted by the anti-removal monitoring circuitry, and when the processing module receives the pulse voltage signal outputted by the anti-removal monitoring circuitry, the processing module generates the alarm signal in real time, and further may transmit the alarm signal to a user terminal, for giving an alarm.

In the example shown in FIG. 2, the processing module may be any computing device with the computation function or any terminal with the computation function as a whole, such as a processor, a calculator, or the like, all of which fall within the protection scope of the present disclosure.

It should be noted that the user terminal according to the present disclosure may be a tablet computer, a mobile phone, a computer or other communication terminals.

Figure 3:
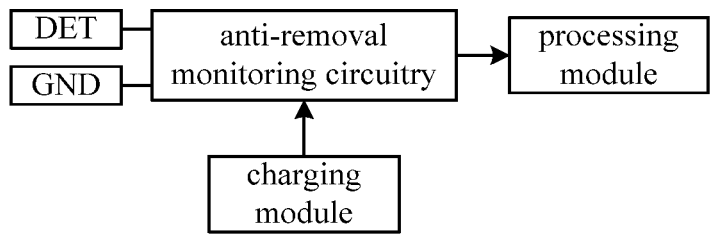
FIG. 3 shows a structural block diagram of an electronic tag according to at least one embodiment of the present disclosure.

In some optional embodiments, as shown in FIG. 3, the electronic tag further includes a charging module, mainly configured to supply power to the electronic tag.

Figure 4:
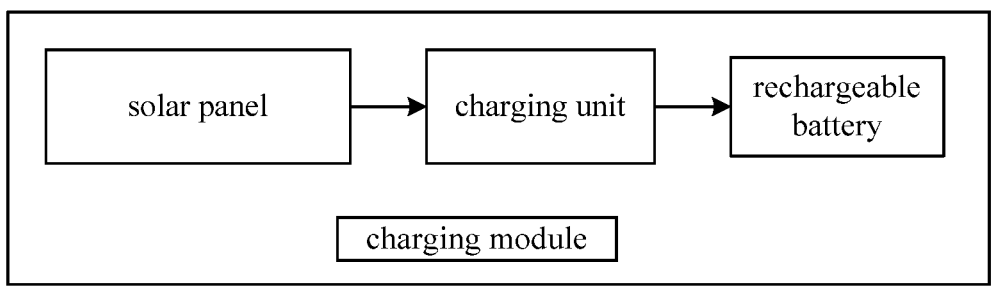
FIG. 4 shows a structural block diagram of a charging module according to at least one embodiment of the present disclosure.

In some optional embodiments, as shown in FIG. 4, the charging module mainly includes a solar panel, a charging unit and a rechargeable battery, and the rechargeable battery may convert luminous energy collected by the solar panel into electric energy to charge the rechargeable battery which may be a lithium ion battery.

Figure 5:
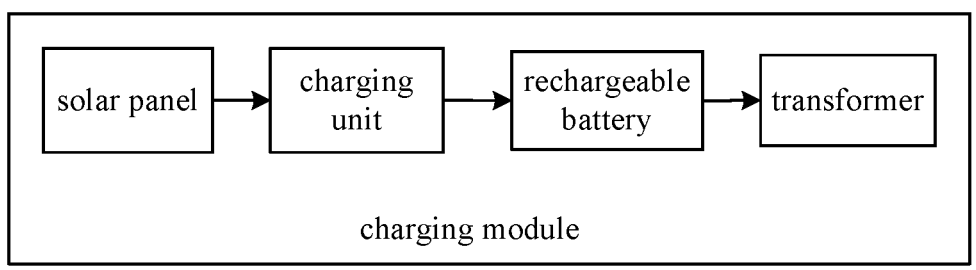
FIG. 5 shows a circuit diagram of a charging module according to at least one embodiment of the present disclosure.

In some optional embodiments, as shown in FIG. 5, the charging module further includes a transformer, mainly configured to convert the voltage of the rechargeable battery into a voltage as needed, thereby supplying power to the electronic tag.

Figure 6:
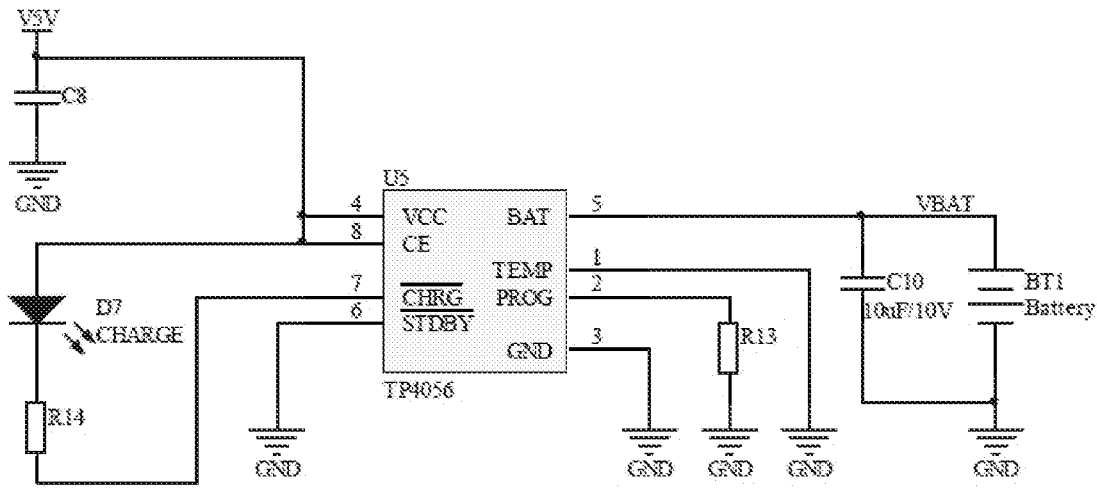
FIG. 6 shows a circuitry diagram of a charging module according to at least one embodiment of the present disclosure.

In some optional embodiments, as shown in FIG. 6, a TP4056 charging chip may be used as the charging unit. However, persons skilled in the art should understand that the charging unit may be any device with the charging function, which falls within the protection scope of the present disclosure. With the solar panel, the electric power may be stored in the charging unit by using illumination capability, which saves power consumption. The charging unit has the dual function of storing and charging, which not only implements charging, but also solves the problem of battery damage due to a power consumption of the battery itself.

In the embodiment shown in FIG. 6, an output terminal (BAT terminal in FIG. 6) of the TP4056 charging chip is connected to the rechargeable battery (Battery in FIG. 6); a battery temperature detection input terminal (TEMP terminal in FIG. 6) is grounded; a constant current charging current setting and charging current monitoring terminal is connected with a first terminal of the resistor R13, a second terminal of the resistor R13 is grounded; a positive input terminal (VCC terminal in FIG. 6) for inputting voltage is connected with an output terminal (V5V terminal in FIG. 6) of the solar panel, the V5V terminal is taken as an input terminal of an external charging power supply; a chip enable input terminal is connected with the output terminal of the solar panel and a first terminal of a D7LED lamp respectively, a second terminal of the D7LED lamp is connected with a first terminal of the resistor R14; a charging state indicator terminal (CHRG terminal in FIG. 6) with open drain output is connected with a second terminal of the resistor R14; a battery charging complete indicator terminal (STDBY terminal in FIG. 6) is grounded; and in FIG. 6, the resistor R13 is configured to set a size of the charging current, and the D7LED lamp is configured to show the charging state.

Figure 7:
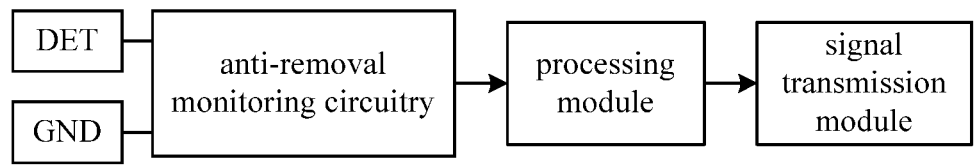
FIG. 7 shows a structural block diagram of an electronic tag according to at least one embodiment of the present disclosure.

In some optional embodiments, as shown in FIG. 7, the electronic tag further includes a signal transmission module, mainly configured to transmit the alarm signal generated by the processing module to the user terminal for giving an alarm. The signal transmission module may be any other devices with a wireless transmission function, such as cellular network equipment, WiFi network equipment, or the like, which should all fall within the protection scope of the present disclosure.

Figure 8:
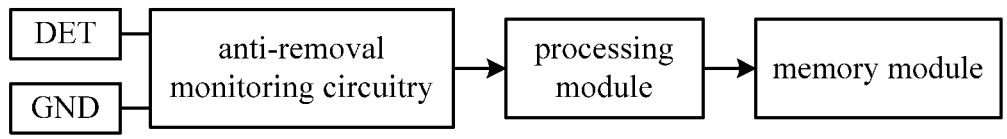
FIG. 8 shows a structural block diagram of an electronic tag according to at least one embodiment of the present disclosure.

In some optional embodiments, as shown in FIG. 8, the electronic tag further includes a memory module, mainly configured to store user information, and the user information including user fingerprint information, vehicle information or personal information of other users. Upon receipt of receiving the pulse voltage signal, the processing module encrypts the user information stored in the memory module.

In the present embodiment, when the processing module receives the pulse voltage signal, the processing module protects the user information pre-stored in the memory module, which may avoid the user information from being revealed after the electronic tag is stolen, and improve the safety.

The memory module may be any device with a storage function or any terminal with the storage function as a whole, such as a USB flash disk, a SD flash memory card, or the like.

Figure 9:
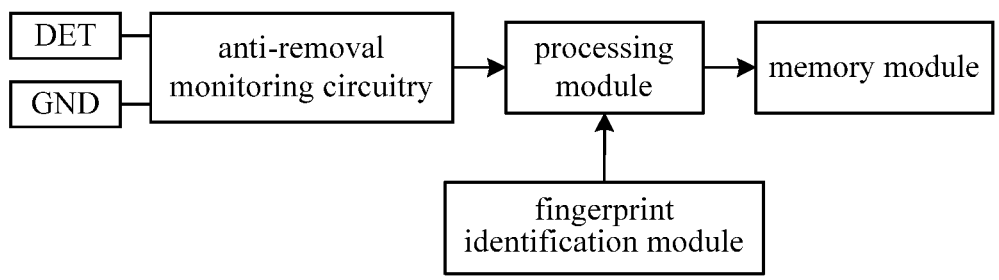
FIG. 9 shows a structural block diagram of an electronic tag according to at least one embodiment of the present disclosure.

In some optional embodiments, as shown in FIG. 9, the electronic tag further includes a fingerprint identification module, mainly configured to collect fingerprint and compare the collected fingerprint with the user fingerprint stored in the memory. When the collected fingerprint is the same as the user fingerprint stored in the memory, the processing module may decrypt the user information.

In a specific embodiment, when the user gets the electronic tag back after the electronic tag is removed, and keeps using the electronic tag for the second time, the user fingerprint is compared with the user fingerprint stored in the memory by the fingerprint identification module. After the successful comparison, the processing module decrypts the user information, thereby enabling the user to keep using the electronic tag, without a need of replacement.

Figure 10:
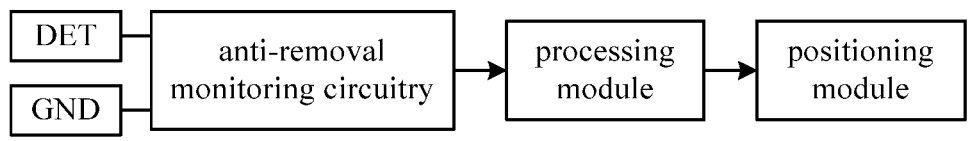
FIG. 10 shows a structural block diagram of an electronic tag according to at least one embodiment of the present disclosure.

In some optional embodiments, as shown in FIG. 10, the electronic tag further includes a positioning module, which collects position information of the electronic tag in response to a control signal transmitted when the processing module receives the pulse voltage signal. In the specific embodiment of the present disclosure, the position information collected by the positioning module may be transmitted to the user terminal by the signal transmission module.

In a specific embodiment of the present disclosure, after the processing module receives the pulse voltage signal, and the processing module transmits the control signal to the positioning module, such that the positioning module collects the position information of the electronic tag, and transmits the position information to the user terminal by the signal transmission module. Therefore, the user may obtain the position information of the electronic tag in real time, and conveniently look for and get back the electronic tag.

In the specific example shown in FIG. 10, the positioning module may be any device with a positioning function or the terminal with a positioning function as a whole, such as a GPS (Global Position System) positioning device, a Beidou satellite positioning system, or the like.

Figure 11:
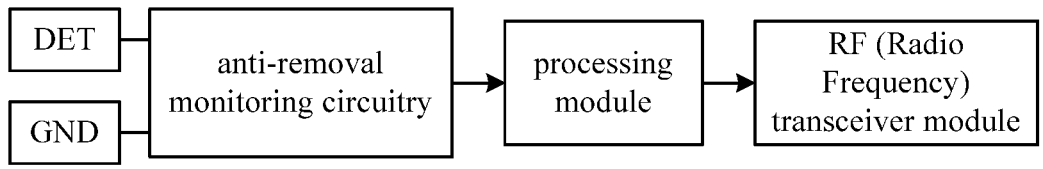
FIG. 11 shows a structural block diagram of an electronic tag according to at least one embodiment of the present disclosure.

In some optional embodiments, as shown in FIG. 11, the electronic tag further includes an RF transceiver module, connected with the processing module. When the pulse voltage signal is transmitted to the processing module and the RF transceiver module receives a request from the reader reading the user information stored in the electronic tag in advance, the processing module is configured to prohibit the reader from reading the user information, and instruct the RF transceiver module to transmit the alarm signal to the reader, for giving an alarm.

Figure 12:
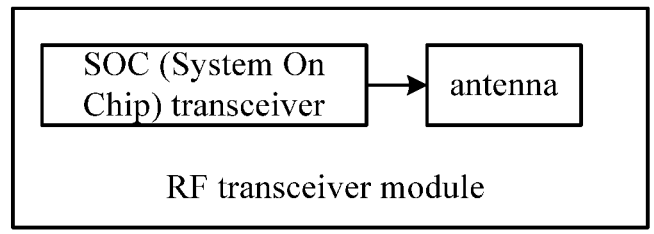
FIG. 12 shows a structural block diagram of an RF(Radio Frequency) transceiver module in FIG. 11.

In the embodiment shown in FIG. 12, the RF transceiver module includes a SOC (System On Chip) transceiver and an antenna. The antenna receives an information reading request from the reader and transmits the information reading request to the SOC transceiver. The processing module is configured to prohibit the reader from reading the user information upon receipt of the pulse voltage signal, and instruct the RF transceiver module to transmit the alarm signal to the reader, for giving an alarm.

It should be noted that the reader in the present disclosure usually refers to an RFID reader set up at the roadside.

When receiving the pulse voltage signal outputted by the anti-removal monitoring circuitry, the processing module encrypts the user information stored in the memory, changes an original operation of transmitting the user information to the RFID reader arranged on the road into another operation of transmitting the alarm signal to the RFID reader. If this electronic tag is reused by other persons, the RFID reader reads the alarm signal, and in this case, the system would know that the electronic tag is used illegally, and such a setting plays the roles of giving an alarm and positioning.

Figure 13:
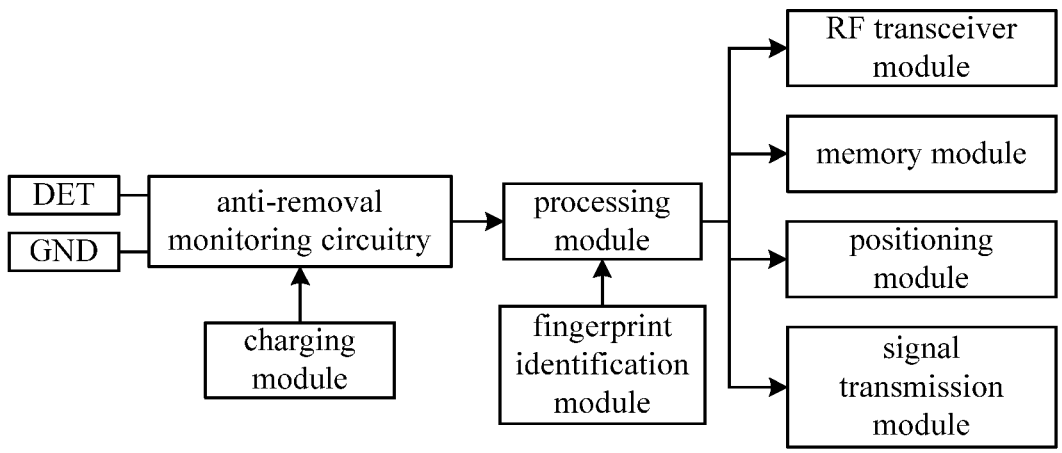
FIG. 13 shows a structural block diagram of an electronic tag according to at least one embodiment of the present disclosure.

An optional embodiment as shown in FIG. 13 may be obtained in combination with the embodiments in FIGS. 2 to 12.

Figure 14:
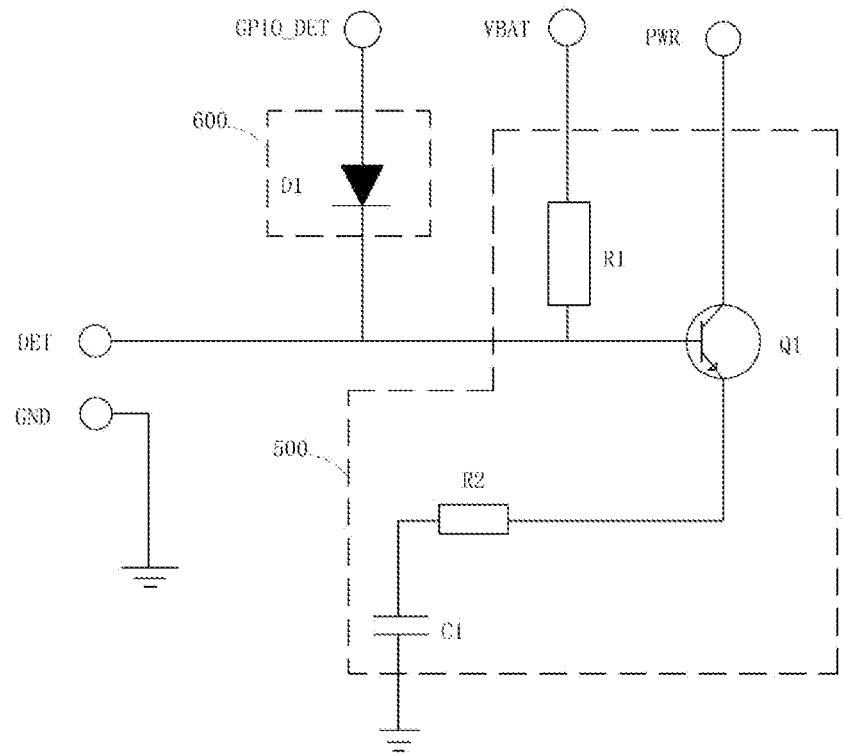
FIG. 14 shows a circuit diagram of an anti-removal monitoring circuitry according to at least one embodiment of the present disclosure.

FIG. 14 shows a circuit diagram of an anti-removal monitoring circuitry according to at least one embodiment of the present disclosure. According to the above-mentioned electronic tag, the anti-removal monitoring circuitry is further described in combination with FIG. 14 according to the embodiment of the present disclosure. In the example shown in FIG. 14, the first input terminal is a DET terminal, the second input terminal is a GND terminal, a detecting terminal is a GPIO_DET terminal, the power input terminal is a VBAT terminal, and the output terminal is a PWR terminal in FIG. 14.

As shown in FIG. 14, the anti-removal monitoring circuitry includes a shutdown circuit 600 and a starting-up circuit 500.

The shutdown circuit 600 is configured to control the electronic tag to be in a shutdown state in response to conduction between the first input terminal and the second input terminal.

It should be noted that the shutdown state herein means that the processing module on the electronic tag controls the signal transmission module, the memory module, the positioning module and the RF transceiver module to stop working in a case that the pulse voltage signal is not received, and thus the anti-removal monitoring circuitry may not give an alarm.

The starting-up circuit 500 is configured to control the output terminal PWR to output a pulse voltage signal in response to disconnection between the first input terminal and the second input terminal, in such a manner that the electronic tag generates an alarm signal in response to the pulse voltage signal.

It should be noted that the second input terminal is configured to receive a fifth voltage. In the example shown in FIG. 14, the second input terminal is grounded, that is, the fifth voltage is 0. Persons skilled in the art may understand that the fifth voltage is not limited thereto.

In the example shown in FIG. 1, the punched holes 110 of the electronic tag arranged on the housing body 100 are matched with the first input terminal and the second input terminal, respectively.

When the electronic tag is used normally, the first input terminal and the second input terminal are conducted, i.e., short-circuit, and no signal is outputted at the output terminal. When the electronic tag is removed, the first input terminal and the second input terminal are disconnected, i.e., open-circuit, and the output terminal outputs the pulse voltage signal into the processing module.

In the embodiment of the present disclosure, the starting-up circuit 500 includes:

a switch element Q1, a control terminal of which is connected with the first input terminal DET, and a first terminal of which is connected with the output terminal PWR;

an RC charging unit 501, a first terminal of which is connected with a second terminal of the switch element Q1, and a second terminal of which is connected with a first voltage input terminal; and a first resistor R1, a first terminal of which is connected with a power input terminal VBAT, the power input terminal VBAT receiving a power voltage for supplying power to the anti-removal monitoring circuitry, and a second terminal of which is connected with a control terminal of the switch element Q1.

In the embodiment of the present disclosure, the first resistor R1 is a pull-up resistor, and is mainly configured to maintain the control terminal of the switch element Q1 to be at a high level. In order to make the circuitry work normally, the voltage input from the power input terminal VBAT is maintained at the high level. The R1 resistor is configured not only to limit a current, but also maintain the voltage.

In the embodiments of the present disclosure, a second terminal of the RC charging unit 501 is configured to receive the first voltage inputted from the first voltage input terminal. In the example of FIG. 14, the second terminal of the RC charging unit 501 is grounded, i.e., the first voltage is 0. Persons skilled in the art may understand that the first voltage is not limited thereto.

In the example of FIG. 14, the switch element Q1 may be a triode or a MOS (Metal Oxide Semiconductor) tube. When the triode is used, the first terminal of the switch element Q1 shown in FIG. 14 is a collector, its second terminal is an emitter, and its control terminal is a base; and when the MOS tube is used, the first terminal of the switch element Q1 shown in FIG. 14 is a drain, its second terminal is a source and its control terminal is a gate.

In the example of FIG. 14, the shutdown circuit 600 includes: a first diode D1, a cathode of which is connected with the control terminal of the switch element Q1. A cathode of the first diode D1 is in a low level in response to the conduction between the first input terminal and the second input terminal, and an anode of the first diode D1 is electrically connected with the detecting terminal GPIO_DET.

Figure 15:
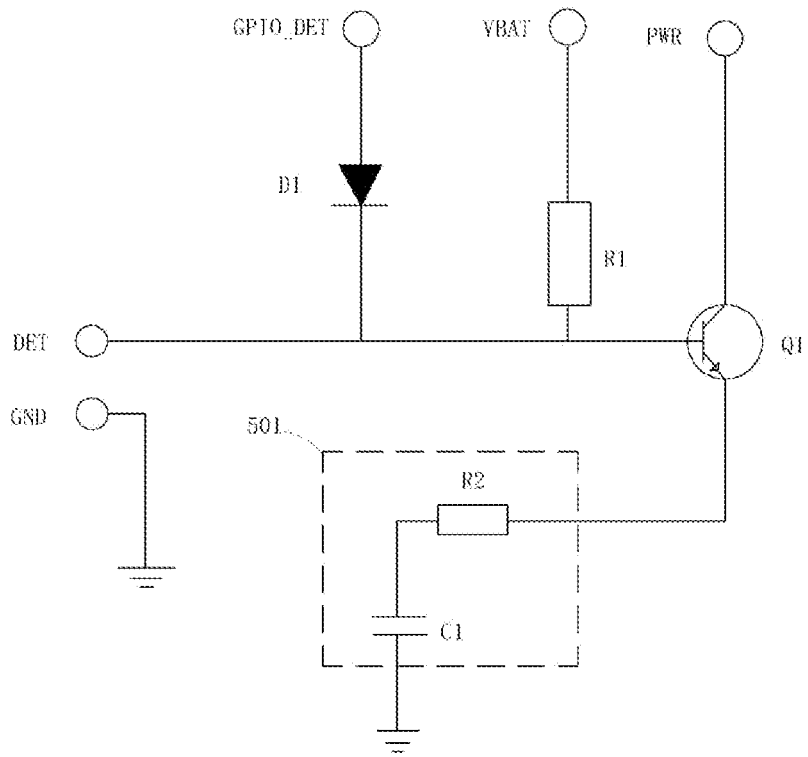
FIG. 15 shows a circuit diagram of an RC charging unit of an anti-removal monitoring circuitry shown in FIG. 14.

In the example as shown in FIG. 15, the RC charging unit 501 includes a second resistor R2 and a first capacitor C1. A first terminal of the second resistor R2 is connected with a second terminal of the switch element Q1. A first terminal of the first capacitor C1 is connected with a second terminal of the second resistor R2, and a second terminal of the first capacitor C1 receives a first voltage.

R2 mainly plays a role of damping in the circuitry, usually for avoiding an overlarge impact current of C1 and reducing vibration caused by inductance and capacitance of the circuitry. C1 is mainly configured to charge.

Hereinafter, the working principle of the anti-removal monitoring circuitry will be described according to its circuit diagram shown in FIG. 14. Illustratively, the triode is used as the switch element Q1. The anti-removal monitoring circuitry is electrically connected with the charging module through the power input terminal. The processing module is electrically connected with the starting-up circuit 500 through the output terminal PWR and the detecting terminal GPIO_DET. The output terminal PWR and the detecting terminal GPIO_DET each is in a high level. When the electronic tag is in normal condition, the first input terminal and the second input terminal are conducted, the switch element Q1 is not turned on, and the output terminal PWR does not output a signal. The cathode of the first diode D1 has a low level, such that the first diode D1 is turned on and the detecting terminal GPIO_DET has a low level. When it is detected by the processing module that the detecting terminal GPIO_DET has a low level, the electronic tag is turned off, such that the electronic tag does not start working. When the first input terminal and the second input terminal are disconnected, the power input terminal VBAT has a high level. The first resistor R1 is a pull-up resistor, so the cathode of the first diode D1 has a high level, such that the first diode D1 is not turned on, and the detecting terminal has a high level. The base of the switch element Q1 receives the voltage outputted from the power input terminal VBAT, and the collector of the switch element Q1 receives the voltage output from the output terminal PWR. The switch element Q1 is turned on, and the RC charging unit 501 is charged. During the process of the RC charging unit 501 being charged, the level of the output terminal PWR would decrease gradually, and the level of the emitter of the switch element Q1 would rise. When the level of the emitter of the switch element Q1 rises to become greater than the level of the base of the switch element Q1, the switch element Q1 is not turned on, such that the level of the output terminal rises from the low level to the high level. At this point, the output terminal PWR outputs one pulse voltage signal to the processing module, such that the processing module starts to work.

Figure 16:
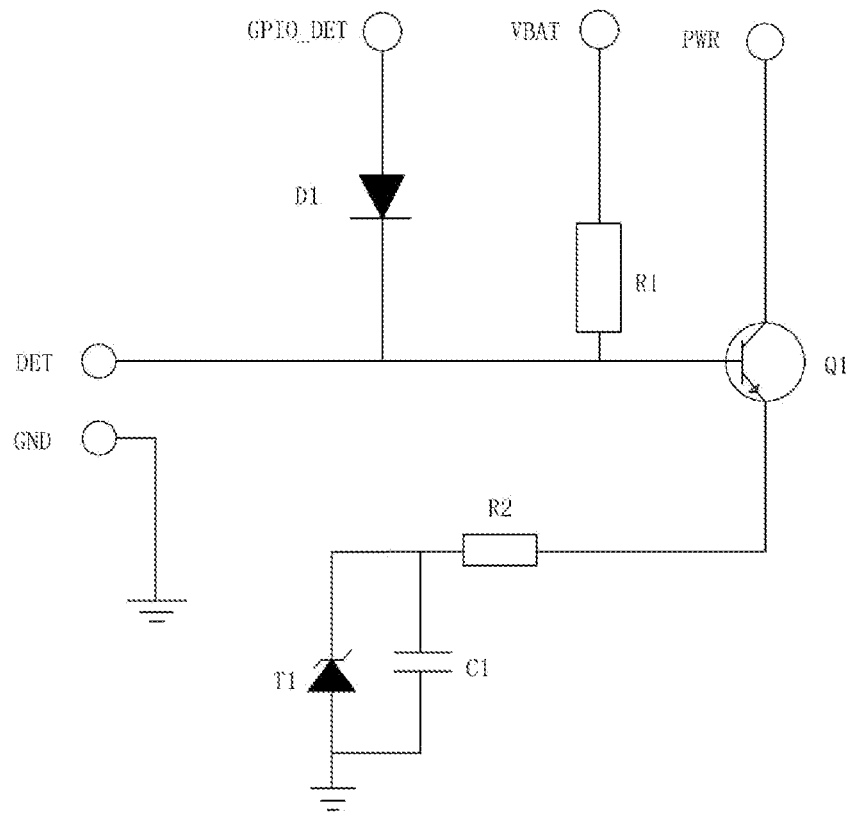
FIG. 16 shows a circuit diagram of an anti-removal monitoring circuitry according to at least one embodiment of the present disclosure.

In some optional embodiments, as shown in FIG. 16, the anti-removal monitoring circuitry further includes: a first voltage-regulator diode T1, a cathode of which is connected with a first terminal of the first capacitor C1, and an anode of which is connected with a second terminal of the first capacitor C1.

The first voltage-regulator diode T1 is anti-static, which effectively prevents the anti-removal monitoring circuitry from being damaged due to static electricity, and increases its safety performance.

Figure 17:
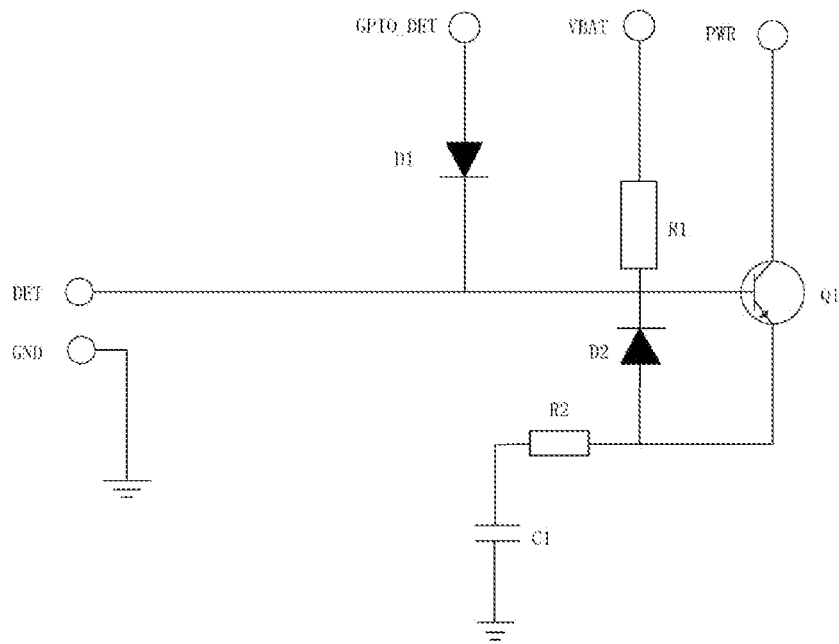
FIG. 17 shows a circuit diagram of an anti-removal monitoring circuitry according to at least one embodiment of the present disclosure.

In some optional embodiments, as shown in FIG. 17, the anti-removal monitoring circuitry further includes a second diode D2, a cathode of which is connected with a control terminal of the switch element Q1, and an anode of which is connected with a second terminal of the switch element Q1.

The second diode D2 is in a series-opposing connection with the second terminal of the switch element Q1, which is a protection clamping for preventing an inverse high voltage from being applied to the second terminal of the switch element Q1, and preventing the second terminal of the switch element Q1 from being broken down by a high voltage.

It should be noted that the high voltage herein is inputted from the power input terminal VBAT.

Figure 18:
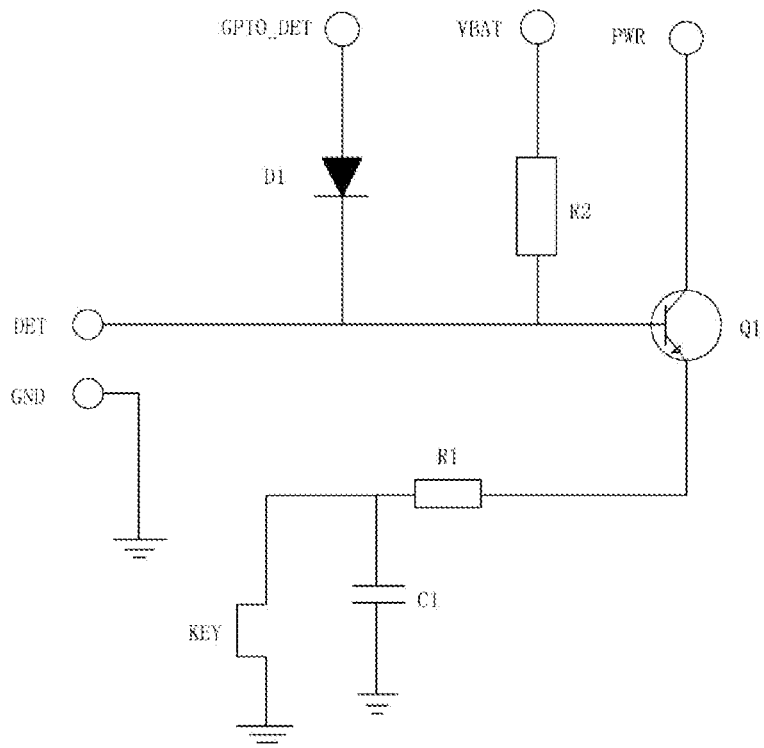
FIG. 18 shows a circuit diagram of an anti-removal monitoring circuitry according to at least one embodiment of the present disclosure.

In some optional embodiments, as shown in FIG. 18, the anti-removal monitoring circuitry further includes: a manual switch KEY, a first terminal of which is connected with a first terminal of the first capacitor C1, and a second terminal of which is connected with a second voltage input terminal. The manual switch is configured to control the electronic tag to be in a shutdown state or in a starting up state in response to a manual trigger of an operator.

In the embodiment of the present disclosure, a second terminal of the manual switch KEY receives the second voltage inputted from the second voltage input terminal. In the example in FIG. 18, the second terminal of the manual switch KEY is grounded, i.e., the second voltage is 0. Persons skilled in the art may understand that the second voltage is not limited thereto.

It should be noted that shutdown herein means that the processing module on the electronic tag controls the signal transmission module, the memory module, the positioning module and the RF transceiver module to stop working when not receiving the pulse voltage signal, thereby not giving an alarm. That is, by arranging the manual switch, the user may manually start up or shut down the anti-removal monitoring circuitry, such that the user may control the starting-up or shutdown of the electronic tag. When the electronic tag is not used, the user may shut down the electronic tag by triggering the manual switch KEY, thereby saving electricity, and reducing consumption. When the manual switch KEY is closed, the emitter of the switch element Q1 is grounded. At this point, the switch element Q1 matches the conduction condition, and the output terminal changes into a low level from a high level. When it is detected by the processing module that the output terminal has a low level, the electronic tag is shut down.

Figure 19:
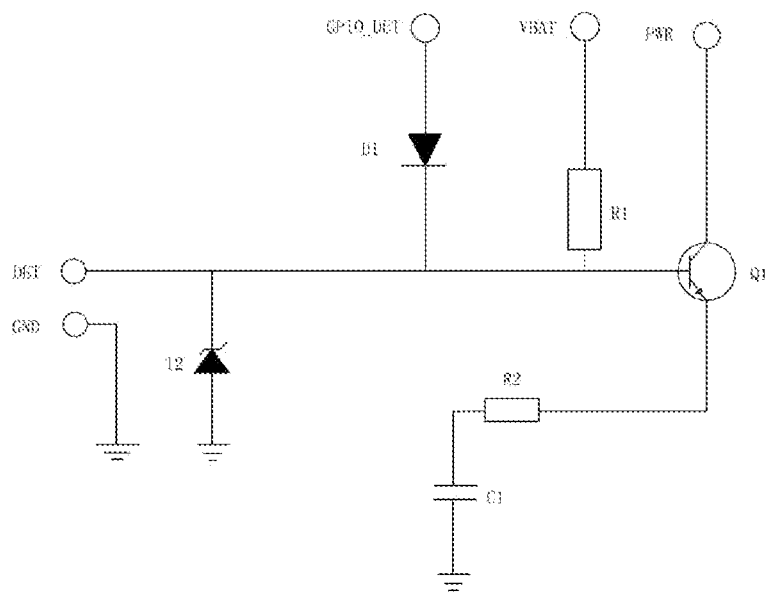
FIG. 19 shows a circuit diagram of an anti-removal monitoring circuitry according to at least one embodiment of the present disclosure.

In some optional embodiments, as shown in FIG. 19, the anti-removal monitoring circuitry further includes: a second voltage-regulator diode T2, a cathode of which is connected with the first input terminal, and an anode of which is connected with a third voltage input terminal.

In the specific embodiment of the present disclosure, the anode of the second voltage-regulator diode T2 receives a third voltage input from the third voltage input terminal. In the specific example of FIG. 19, the anode of the second voltage-regulator diode T2 is grounded, i.e., the third voltage is 0. Persons skilled in the art may understand that the third voltage is not limited thereto.

The second voltage-regulator diode T2 is anti-static, which effectively prevents the anti-removal monitoring circuitry from being damaged due to static electricity, and increases its safety performance.

Figure 20:
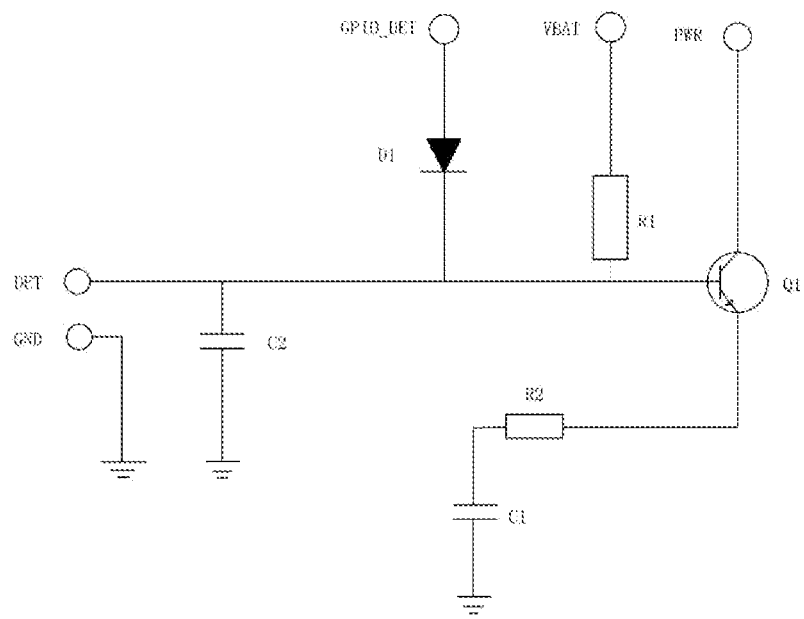
FIG. 20 shows a circuit diagram of an anti-removal monitoring circuitry according to at least one embodiment of the present disclosure.

In at least one optional embodiment of the present disclosure shown in FIG. 20, the anti-removal monitoring circuitry further includes: a second capacitor C2, a first terminal of which is connected with the first input terminal, and a second terminal of which is connected with a fourth voltage input terminal.

In a specific embodiment of the present disclosure, the second terminal of the second capacitor C2 receives a fourth voltage input from the fourth voltage input terminal. In the specific example of FIG. 20, the second terminal of the second capacitor C2 is grounded, i.e., the fourth voltage is 0. Persons skilled in the art may understand that the fourth voltage is not limited thereto.

The second capacitor C2 realizes the filtering function, thereby more stabilizing operating performance of the anti-removal monitoring circuitry.

Figure 21:
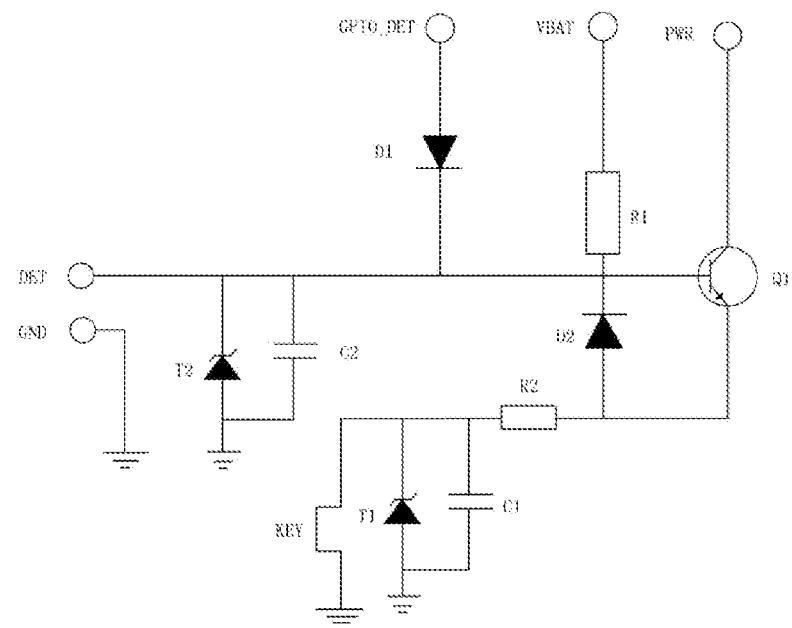
FIG. 21 shows a circuit diagram of an anti-removal monitoring circuitry according to at least one embodiment of the present disclosure.

An optional embodiment as shown in FIG. 21 may be obtained in combination with the specific examples of FIGS. 14 to 20.

Another aspect of the present disclosure provides an anti-theft system for an electronic tag, including a base 200 and the above-mentioned electronic tag.

Figure 22:
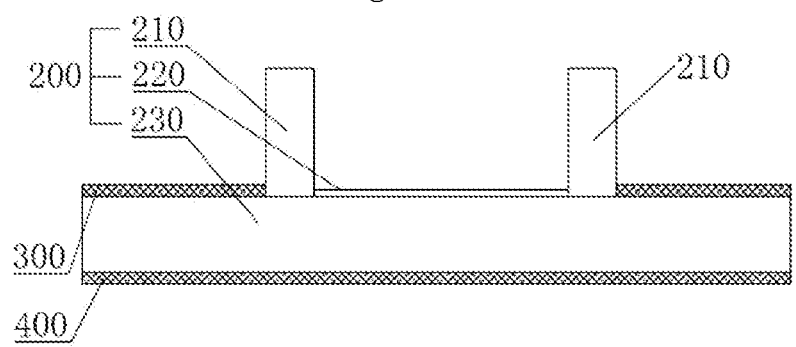
FIG. 22 shows a front view of a base according to at least one embodiment of the present disclosure.

In the example shown in FIG. 22, the base 200 includes:
a chassis 230;
a pair of conductive posts 210, arranged on the chassis 230, penetrating through the two punched holes 110 of the housing body 100 respectively, and electrically connected with the first input terminal and the second input terminal respectively; and
a conductive element 220, arranged on a first surface of the chassis 230 where the conductive posts 210 are located, configured to electrically connect the pair of conductive posts 210 and located between the pair of conductive posts.

Figure 23:
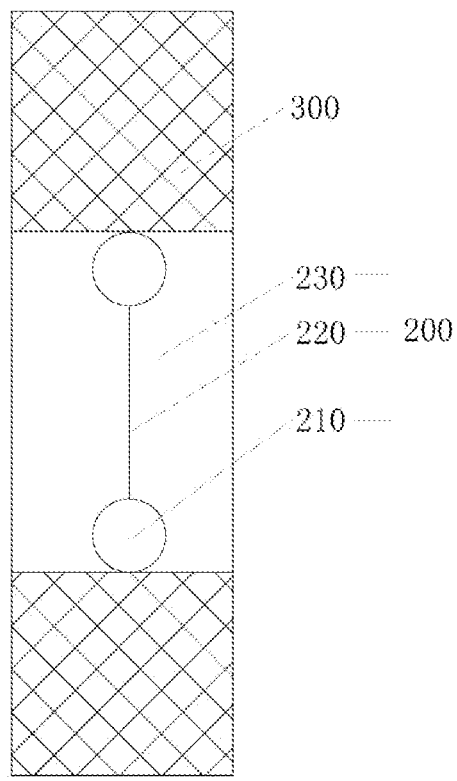
FIG. 23 shows a top view of a base according to at least one embodiment of the present disclosure.

In some optional embodiments, as shown in FIG. 23, an adhesive layer 300 (first adhesive layer) is arranged on the first surface, mainly configured to adhere the electronic tag onto the chassis 230.

Figure 24:
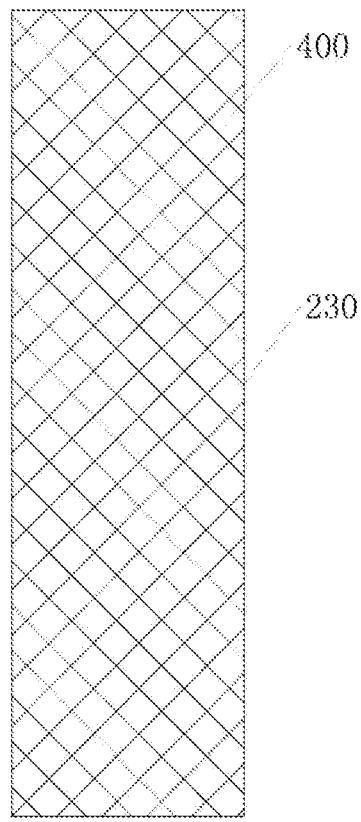
FIG. 24 shows a bottom view of a base according to at least one embodiment of the present disclosure.

In some optional embodiments, as shown in FIG. 24, a second adhesive layer 400 is arranged on the chassis 230, and is configured to adhere the base 200 onto a preset mounting position of the vehicle.

It should be noted that the second adhesive layer 400 may be located on a surface of the chassis 230 other than the first surface, the chassis 230 may be made of a flexible material, and the mounting position may selected by the user according to practical requirements.

In the specific embodiment of the present disclosure, the conductive posts 210 and the conductive elements 220 may be made of metal. Specifically, the conductive posts 210 may be made of metal wires. However, persons skilled in the art should understand that the conductive posts 210 and the conductive elements 220 may be made of any conductive material, which should fall within the protection scope of the present disclosure.

In the specific embodiment of the present disclosure, the chassis 230 is made of rubber, plastic and/or rubber. However, persons skilled in the art should understand that the chassis 230 may be made of any flexible material, which should all fall within the protection scope of the present disclosure.

In the specific embodiment of the present disclosure, the first adhesive layer 300 and the second adhesive layer 400 may be made of glue. However, persons skilled in the art should understand that the first adhesive layer 300 and the second adhesive layer 400 may be made of any adhesive material, which should fall within the protection scope of the present disclosure.

Figure 25:
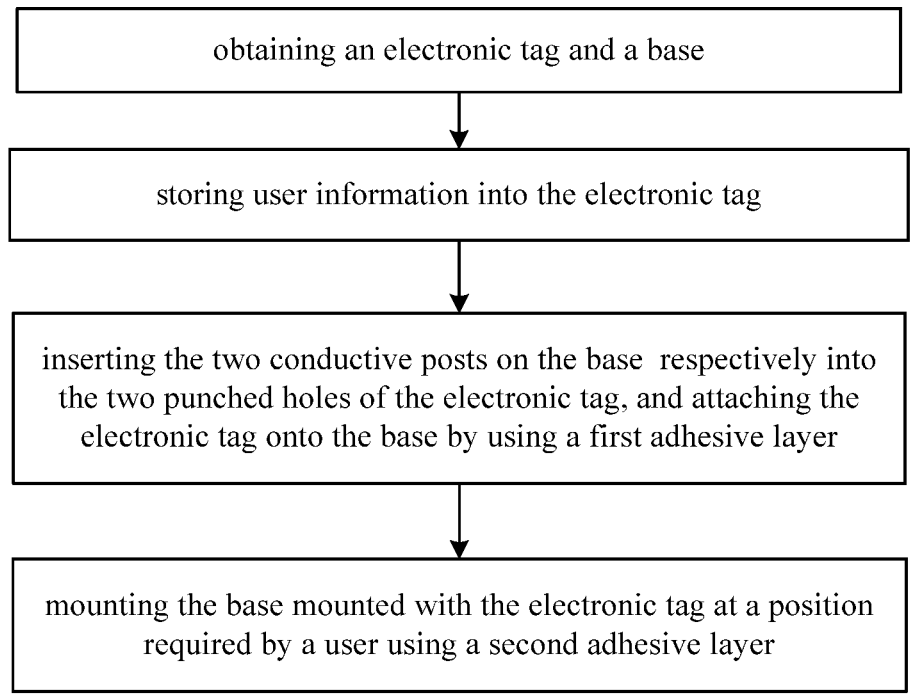
FIG. 25 shows a flow chart of mounting an electronic tag on a base according to at least one embodiment of the present disclosure.
Figure 26:
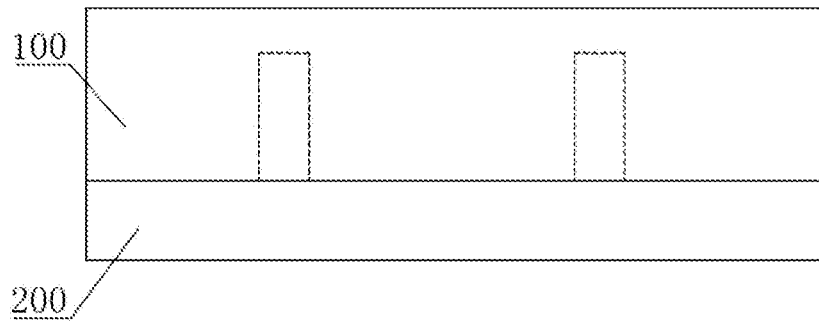
FIG. 26 shows a schematic diagram of the electronic tag mounted on the base according to at least one embodiment of the present disclosure.

FIG. 25 is a flow chart of mounting the electronic tag onto a base. When obtaining the electronic tag and the base 200 from a vehicle administration office by a user, user information is firstly inputted into the electronic tag and stored in the memory module, the two conductive posts 210 of the base 200 are respectively inserted into the two punched holes 110 of the electronic tag to make the two conductive posts 210 and the two punched holes 110 in a sufficient contact, respectively, and the electronic tag is attached onto the base 200 by using the first adhesive layer 300 to enable the first input terminal and the second input terminal to be electrically connected, and thereby shutting down the electronic tag. In use, the base 200 mounted with the electronic tag is mounted at any position required by the user using the second adhesive layer 400. In this way, the assembly is finished as shown in FIG. 26.

Figure 27:
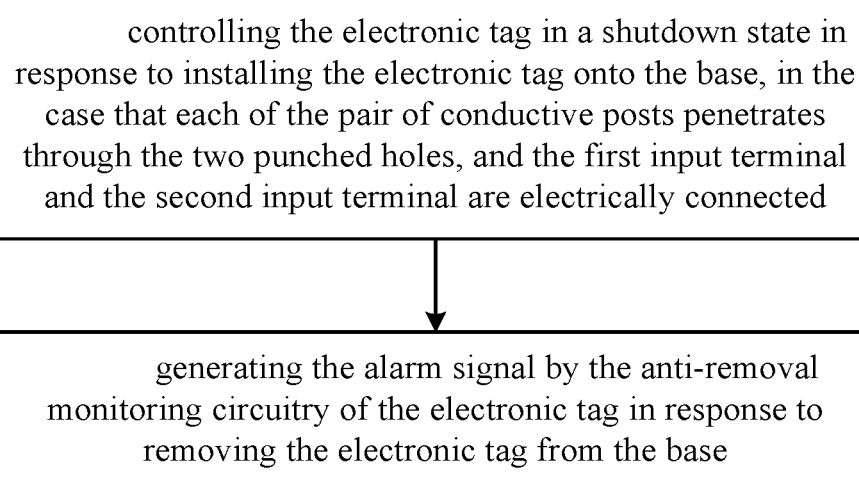
FIG. 27 shows a flow chart of an anti-theft method according to at least one embodiment of the present disclosure.

In another aspect, an anti-theft method of the anti-theft system according to at least one embodiment of the present disclosure will be described below according to FIG. 27. The method includes:

controlling the electronic tag in a shutdown state in response to attaching the electronic tag onto the base 200 by using the first adhesive layer 300, in the case that each of the pair of conductive posts 210 penetrates through the two punched holes 110, and the first input terminal and the second input terminal are electrically connected; and generating the alarm signal by the anti-removal monitoring circuitry of the electronic tag in response to removing the electronic tag from the base 200.

In the specific embodiment of the present disclosure, since the base 200 and the electronic tag are adhered by the first adhesive layer 300, the punched holes 110 tend to be separated from the conductive posts 210, when the electronic tag is removed from the base 200. In this way, the electronic tag would be started up to give an alarm. In addition, since the conductive element 220 is configured to electrically connect the two conductive posts 210, the conductive element 220 is easily damaged during the removal, thereby further increasing the anti-theft capability. When the electronic tag is removed from the base 200, the electronic tag is started up to give alarms.

Figure 28:
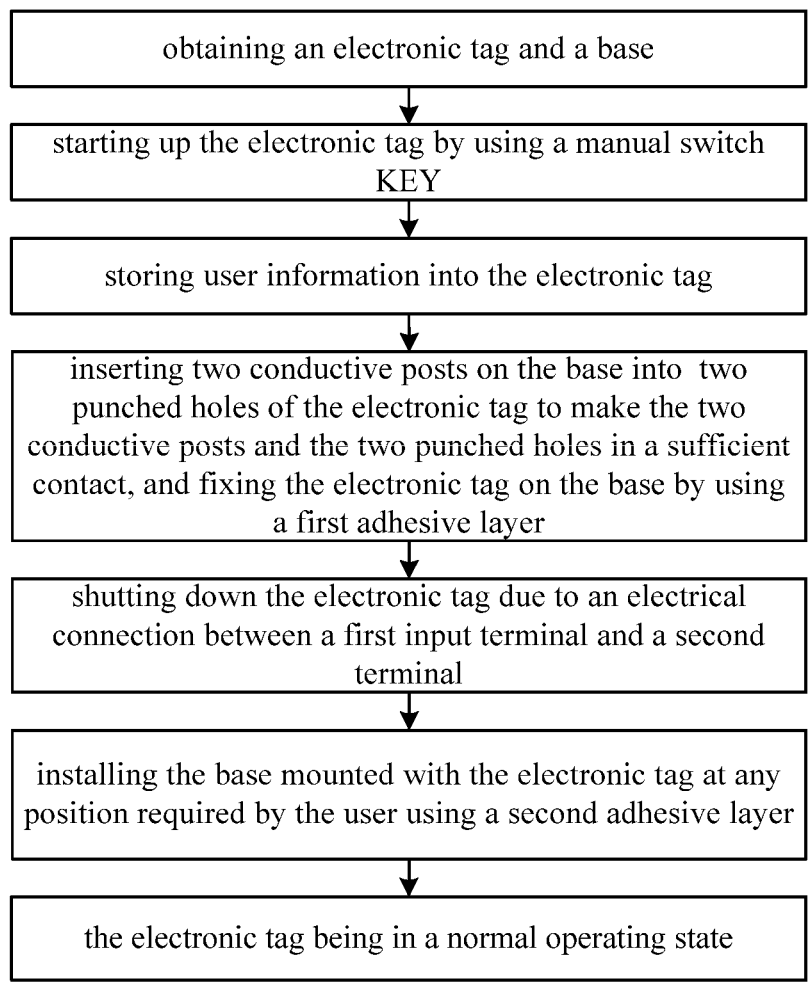
FIG. 28 shows a flow chart when an electronic tag is in a normal operating state according to at least one embodiment of the present disclosure.

Finally, the anti-theft system for an electronic tag according to the present disclosure will be introduced according to practical application scenarios. FIG. 28 is a flow chart when the electronic tag is working normally. When obtaining the electronic tag and the base 200 from the vehicle administration office, the user firstly starts up the electronic tag by the manual switch KEY on the electronic tag, and inputs the user information (including owner fingerprint) into the electronic tag, and the user information is stored in the memory module. Next, the user inserts the two conductive posts 210 on the base 200 into the two punched holes 110 of the electronic tag to make the two conductive posts 210 and the two punched holes 110 in a sufficient contact, respectively, and fixes the electronic tag on the base 200 by using the first adhesive layer 300, to enable the first input terminal and the second input terminal to be electrically connected, and thereby shutting down the electronic tag. In use, the base 200 mounted with the electronic tag is mounted at any position required by the user using the second adhesive layer 400. In this way, the assembly is finished, and the electronic tag is capable of working normally.

Figure 29:
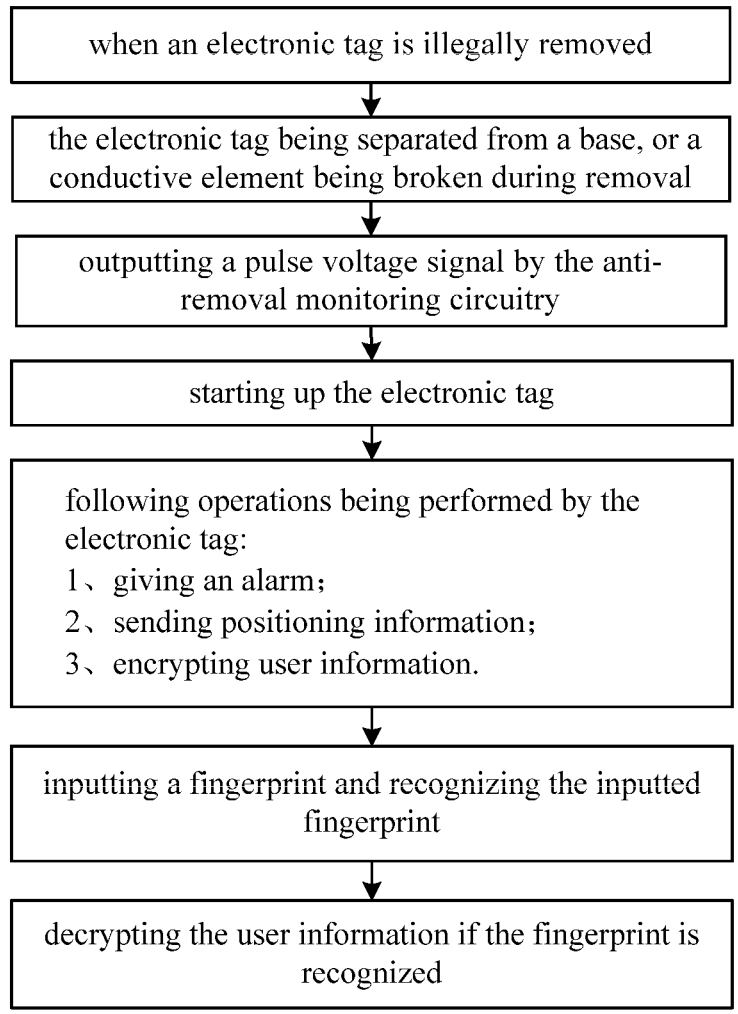
FIG. 29 shows a flow chart when an electronic tag is illegally removed according to at least one embodiment of the present disclosure.

FIG. 29 shows a flow chart when the electronic tag is illegally removed. Since the base 200 and the electronic tag are adhered by the first adhesive layer 300, the base 200 and the electronic tag may be separated, or the conductive element 220 may be broken when the electronic tag is removed, such that the first input terminal and the second input terminal are disconnected, and the processing module in the electronic tag is inputted with the pulse voltage signal from the anti-removal monitoring circuitry, thereby causing the electronic tag to be started up. In this case, the processing module generates the alarm signal and transmits it to a user terminal to alert the user. The processing module transmits the control signal, the memory module responds to the control signal transmitted when the processing module receives the pulse voltage signal, such that the user information is encrypted, so as to prevent a lawbreaker from obtaining the user information. The positioning module responds to the control signal transmitted when the processing module receives the pulse voltage signal, such that the positioning module collects the position information of the electronic tag and transmits the same to the user terminal, so that the user may obtain a real-time position of the electronic tag, which is beneficial to look for and get back the electronic tag. In a case that the lawbreaker mounts the removed electronic tag onto his or her own device for use, the RF transceiver module in the electronic tag receives a request, from a reader, for reading information of a registered user pre-stored in the electronic tag when interactive communication is performed between the reader at the roadside and the anti-theft system, the pulse voltage signal is generated, the electronic tag prohibits the reader from reading the user information, and instructs the RF transceiver module to transmit the alarm signal to the reader, thereby giving a second alarm and alerting the operator or workers at the roadside that this electronic tag is illegal. In addition, when the electronic tag is removed by others or the owner, in case of secondary use, the identification may be performed simply by the fingerprint identification module arranged on the housing body 100. When the collected fingerprint is matched with the user fingerprint pre-stored in the memory module, the memory may decrypt the user information. In this way, the user may keep using the electronic tag, thereby saving costs and avoiding unnecessary wastes.

To sum up, the anti-removal monitoring circuitry, the electronic tag, the anti-theft system and the anti-theft method according to embodiments of the present disclosure have the following advantageous effects.

First, according to the embodiments of the present disclosure, the solar panel is used to collect energy, and store the energy to supply power to the charging unit, which not only solves the problem of charging the electronic tag, but also the problem of battery damage due to a power consumption of the battery itself.

Second, according to the embodiments of the present disclosure, the base and the electronic tag are used cooperatively to monitor whether the electronic tag is removed, and the chassis of the base is made of a flexible material. After damaged, in case of secondary use, only the chassis is required to be changed, without changing the electronic tag.

Third, according to the embodiments of the present disclosure, when the electronic tag and the base are matched with each other, the electronic tag is shut down, which may save electricity. When the electronic tag is removed from the chassis of the base, the electronic tag is started up and gives an alarm, which improves anti-theft performance.

Fourth, according to the embodiments of the present disclosure, When the electronic tag gives an alarm, the stored user information is encrypted to prevent the personal information of the user from being revealed. If the user gets back and continues to use the electronic tag, it is only required to verify the user fingerprint. If the user fingerprint is correct, the electronic tag decrypts the encrypted user information, and recovers to an initial state.

It should be noted that in the above-mentioned device embodiments, each included unit is merely divided according to function logics, and which is not limited thereto, as long as the corresponding function may be realized. In addition, a specific name of each function unit is only for distinguishing one unit from another, and is not used for limiting the protection scope of the present disclosure.

Additionally, those skilled in the art shall understand that all or parts of the steps in the above exemplifying method of the present disclosure may be achieved by related hardware instructed with programs. The corresponding programs may be stored in a computer readable storage medium, which may be ROM, disk, optical disc, or the like.

The above are merely optional embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An anti-removal monitoring circuitry, applied to an electronic tag, comprising a first input terminal, a second input terminal and an output terminal, wherein the anti-removal monitoring circuitry further comprises:
   a shutdown circuit, configured to control the electronic tag to be in a shutdown state in response to connection between the first input terminal and the second input terminal; and
   a starting-up circuit, configured to control the output terminal to output a pulse voltage signal in response to disconnection between the first input terminal and the second input terminal, in such a manner that the electronic tag generates an alarm signal in response to the pulse voltage signal.

2. The anti-removal monitoring circuitry according to claim 1, wherein the starting-up circuit comprises:
   a switch element, having a control terminal connected with the first input terminal, and a first terminal connected with the output terminal;
   a charging unit, having a first terminal connected with a second terminal of the switch element, and a second terminal connected with a first voltage input terminal; and
   a first resistor, having a first terminal connected with a power input terminal, and a second terminal connected with the control terminal of the switch element, wherein the power input terminal is configured to receive a power voltage for supplying power to the anti-removal monitoring circuitry.

3. The anti-removal monitoring circuitry according to claim 2, wherein the shutdown circuit comprises:
   a first diode, a cathode of which is connected with the control terminal of the switch element, and an anode of which is connected with a detecting terminal.

4. The anti-removal monitoring circuitry according to claim 2, wherein the charging unit comprises:
   a second resistor, a first terminal of which is connected with the second terminal of the switch element; and
   a first capacitor, a first terminal of which is connected with a second terminal of the second resistor, and a second terminal of which is connected with a first voltage input terminal.

5. The anti-removal monitoring circuitry according to claim 4, wherein the charging unit further comprises:
   a first voltage-regulator diode, a cathode of which is connected with the first terminal of the first capacitor, and an anode of which is connected with the second terminal of the first capacitor.

6. The anti-removal monitoring circuitry according to claim 4, further comprising:
   a manual switch, a first terminal of which is connected with the first terminal of the first capacitor, and a second terminal of which is connected with a second voltage input terminal, wherein the manual switch is configured to control the electronic tag to be in a shutdown state or in a starting up state in response to a manual trigger of an operator.

7. The anti-removal monitoring circuitry according to claim 4, further comprising:
   a second diode, a cathode of which is connected with the control terminal of the switch element, and an anode of which is connected with the second terminal of the switch element.

8. The anti-removal monitoring circuitry according to claim 1, further comprising:
   a second voltage-regulator diode, a cathode of which is connected with the first input terminal, and an anode of which is connected with a third voltage input terminal.

9. The anti-removal monitoring circuitry according to claim 1, further comprising:
   a second capacitor, a first terminal of which is connected with the first input terminal, and a second terminal of which is connected with a fourth voltage input terminal.

10. The anti-removal monitoring circuitry according to claim 4, further comprising:
    a first voltage-regulator diode, a cathode of which is connected with the first terminal of the first capacitor, and an anode of which is connected with the second terminal of the first capacitor;
    a manual switch, a first terminal of which is connected with the first terminal of the first capacitor, and a second terminal of which is connected with a second voltage input terminal, wherein the manual switch is configured to control the electronic tag to be in a shutdown state or in a starting up state in response to a manual trigger of an operator;
    a second diode, a cathode of which is connected with the control terminal of the switch element, and an anode of which is connected with the second terminal of the switch element;
    a second voltage-regulator diode, a cathode of which is connected with the first input terminal, and an anode of which is connected with a third voltage input terminal; and
    a second capacitor, a first terminal of which is connected with the first input terminal, and a second terminal of which is connected with a fourth voltage input terminal,
    wherein the second input terminal, the first voltage input terminal, the second voltage input terminal, the third voltage input terminal and the fourth voltage input terminal each is grounded.

11. An electronic tag, comprising:
    a housing body, comprising two punched holes;
    an anti-removal monitoring circuitry, arranged on the housing body, comprising a first input terminal, a second input terminal and an output terminal, wherein the anti-removal monitoring circuitry further comprises:
       a shutdown circuit configured to shut down the electronic tag in response to connection between the first input terminal and the second input terminal, and a starting-up circuit configured to control the output terminal to output a pulse voltage signal in response to disconnection between the first input terminal and the second input terminal; and
    a processing module, connected with the anti-removal monitoring circuitry, and configured to receive the pulse voltage signal and generate an alarm signal in response to the pulse voltage signal, wherein the first input terminal and the second input terminal of the anti-removal monitoring circuitry correspond to the two punched holes of the housing body respectively.

12. The electronic tag according to claim 11, further comprising:
    a charging module, connected with the anti-removal monitoring circuitry, and configured to supply power to the electronic tag.

13. The electronic tag according to claim 11, further comprising:
    a memory module, connected with the processing module, and configured to store user information, wherein the processing module is configured to encrypt the user information stored in the memory module, upon receipt of the pulse voltage signal.

14. The electronic tag according to claim 13, further comprising:
    a fingerprint identification module, connected with the processing module, and configured to collect a fingerprint, compare the collected fingerprint with a user fingerprint stored in the memory module, and decrypt the user information when the collected fingerprint is the same as the user fingerprint stored in the memory module.

15. The electronic tag according to claim 11, further comprising:
    a positioning module, connected with the processing module, and configured to collect position information of the electronic tag in response to the processing module receiving the pulse voltage signal.

16. The electronic tag according to claim 11, further comprising:
    an RF (Radio Frequency) transceiver module, connected with the processing module, wherein when the pulse voltage signal is transmitted to the processing module, and the RF transceiver module receives a request from a reader for reading user information pre-stored in the electronic tag, the processing module is configured to prohibit the reader from reading the user information, and instruct the RF transceiver module to transmit the alarm signal to the reader.

17. The electronic tag according to claim 12, wherein the charging module comprises: a solar panel, a charging unit and a rechargeable battery, and the charging unit converts luminous energy collected by the solar panel into electric energy to charge the rechargeable battery.

18. An anti-theft system, for the electronic tag according to claim 11, comprising the electronic tag and a base, wherein the base comprises:
    a chassis;
    a pair of conductive posts, arranged on the chassis, penetrating through the two punched holes respectively, and electrically connected with the first input terminal and the second input terminal respectively; and
    a conductive element, arranged on a first surface of the chassis where the pair of conductive posts is located, located between the pair of conductive posts, and configured to electrically connect the pair of conductive posts.

19. The anti-theft system according to claim 18, wherein an adhesive layer is arranged on the first surface of the chassis where the pair of conductive posts is located, and is configured to adhere the electronic tag onto the chassis.

20. An anti-theft method, for the anti-theft system according to claim 18, comprising:
    controlling the electronic tag in a shutdown state in response to installing the electronic tag onto the base, in the case that each of the pair of conductive posts penetrates through the two punched holes, and the first input terminal and the second input terminal are electrically connected; and
generating the alarm signal by the anti-removal monitoring circuitry of the electronic tag in response to removing the electronic tag from the base.

* * * * *